2,984,608

PREPARATION OF GRAFTED POLYMER COMPOSITIONS

Léon Adany, Champigny-sur-Marne, France, assignor to Societe Anonyme dite: Nobel-Bozel, Paris, France No Drawing. Filed Mar. 31, 1958, Ser. No. 724,932

5 Claims. (Cl. 204—154)

This invention relates to the preparation of polymerized compositions, more especially by "grafting" techniques. In so-called grafting copolymerization processes, a polymerizable monomer is molecularly combined with a carrier substance by the use of an activation process which may comprise any of various mechanical, physical and chemical operations. One particularly advantageous method of activating a monomer and carrier mixture to promote graft-copolymerization thereof, involves irradiating one or both constituents of the mixture with ionizing radiation. It is to this particular class of graft copolymerization processes that the present invention more particularly relates, and objects hereof are to provide improved techniques for the preparation of radiation-grafted copolymers, and also to provide grafted polymer compositions having improved characteristics.

The invention is especially concerned with the nature of the carrier used. Thus one aspect of the invention relates to a method of graft-copolymerizing at least one polymerizable vinyl-base monomer with a carrier comprising at least one saturated paraffinic hydrocarbon (i.e. of the type $C_nH_{2n+2}$). The carrier may form of a mixture of hydrocarbons containing a proportion of not more than 20% of unsaturated hydrocarbons as impurities therein.

The saturated hydrocarbons usable according to the invention may include broadly all solid hydrocarbons, i.e. having a boiling point higher than about 300° C. and a melting range of from 55 to 70° C., as derived from the distillation of tars, wood, turf, lignite, bituminous shale, and also Vaseline which has a melting point of from 30 to 40° C. Substituted paraffins such as chlorinated paraffines may also be used. Practically the saturated hydrocarbons used will frequently be derived from natural sources, and will usually comprise mixtures. While the exact composition of such mixtures need not be fully determined, it is useful or necessary for the purposes of the invention that the proportion of unsaturated hydrocarbons in the mixtures, such as hydrocarbons having the general formulas such as $C_nH_{2n}$, $C_nH_{2n-2}$, and the like, should not exceed about 20%.

The polymerizable vinyl-base monomer used as the graft substance according to the invention may include any vinyl monomer. However, it is preferred to use those vinyl monomers that are liquid at ordinary temperatures such as vinyl acetate, styrene, and acrylonitrile, and the invention is especially concerned with a preparatory or conditioning step applicable to such monomers prior to grafting them on saturated hydrocarbons of the type specified above.

The preparatory step is necessary because, as is known, such monomers are practically not miscible with paraffins at ordinary temperature. At higher temperatures however the monomers become soluble in the paraffins, usually even below the boiling point of the latter. It has been found that the resulting solutions when cooled at a slow enough rate produce stable and homogeneous gels.

It has further been found that when such gels are exposed to ionizing radiations such as X-rays, gamma rays, or accelerated particles, hard, homogeneous, usually opaque compositions are produced having properties differing substantially from those of the polymers that are normally produced by polymerization of the monomers involved.

The invention in one aspect therefore resides in preparing novel compositions by a process which comprises, hot dissolution of one or more polymerizable vinyl-base monomer in one or more saturated hydrocarbon such as paraffin, slowly cooling the resulting solution to form a stable homogeneous gel, and exposing the gel to ionizing radiations.

Effective completion of the grafting process is indicated by the fact that no more paraffin is migrating out of the composition.

The invention will now be described with reference to the following examples which are illustrative only, but not restrictive. In the examples, the paraffin stock used as the carrier constituent, is a mixture melting in the range 60–62° C., and the monomers used are vinyl acetate (Examples 1 and 2 show different proportions of this monomer), styrene and methyl methacrylate.

EXAMPLE 1

An amount of 100 cc. of vinyl acetate having 2 grams paraffin incorporated therein is carried in a test tube to 50° C. The resulting solution is slowly cooled to 20° C. and a gel is obtained.

The tube containing the gel is sealed, but not evacuated, and is then exposed to gamma rays from a source of cobalt 60, until a dose of 1,500,000 roentgens has been applied. The resulting product is hard and translucent, and will hereinafter be termed "composition A."

EXAMPLE 2

The procedure is the same as in Example 1, except that 10 g. paraffin are incorporated in 100 cc. vinyl acetate. The result is "composition B."

EXAMPLE 3

Same procedure again, using 2 grams paraffin in 100 cc. styrene. "Composition C" is obtained.

EXAMPLE 4

The same procedure is used as above, but with 10 grams paraffin incorporated in 100 cc. methyl methacrylate. The resulting composition is termed "composition D."

The physical and physico-chemical characteristics of compositions A, B, C and D are indicated in the following table.

By way of comparison, the same characteristics are also included for each of the following known compositions:

Vinyl acetate homopolymer, called "composition E."
Styrene homopolymer (polystyrol), called "composition F."
Methyl methacrylate homopolymer, called composition G."

Table

| Characteristics | Composition A | Composition B | Composition C | Composition D | Composition E | Composition F | Composition G |
|---|---|---|---|---|---|---|---|
| Softening point, °C | 147 | 52 | 92 | 147 | 25 | 92 | 135. |
| Melting point, °C | softens at 260° C. | 260 | 168, non-fluid starting. | 240 | 108 | 160 | soft at 300° C. |
| Resistance to boiling water | resists | softens | softens slightly. | resists | complete deformation. | softens | softens slightly. |
| Resistance at ordinary temperature to: | | | | | | | |
| Alcohol | do | swells | resists | do | dissolves | resists | resists. |
| Ketones | dissolves | gel | swells | dissolves slightly. | do | dissolves | dissolves. |
| Esters | do | swells | softens | dissolves | do | swells | swells. |
| Perchlorethylene | resists | do | dissolves | resists | swells | dissolves | resists. |
| White spirit | swells | resists when hot. | resists | do | resists | resists | Do. |
| Xylene | do | swells | dissolves | do | dissolves | dissolves | dissolves. |
| Resistance to alkalis (concentrated NaOH). | resists | resists | resists | do | resists | resists | Do. |
| Resistance to acids: | | | | | | | |
| Concentrated $H_2SO_4$ diluted 4 vol. | do | do | do | do | is attacked | do | resists. |
| Concentrated $H_2SO_4$ | is attacked | is attacked | do | is attacked | do | do | is attacked. |
| Water absorption (percent at 20° C., 24 hrs.). | 0.2 | 4 | 0 | 0.3 | 19 | 0 | 0.3. |

Referring to the above table, it will be noted that the chief advantages of the grafted copolymer compositions obtained according to the invention over corresponding homopolymers of the monomers respectively used, can be listed as follows:

(1) In the case of styrene, temperature resistance is improved as indicated by comparison of the softening points of compositions C and F.

(2) In the case of vinyl acetate, improved water resistance is indicated by comparison between compositions A and B on one hand, composition E on the other.

(3) In the case of methyl methacrylate, resistance to alkalis and acids is substantially improved as shown by comparison of compositions D and G.

The novel compositions can be worked by conventional methods and machines, including molding, injection, compression and extrusion. When dissolved they can be spun or coated upon any suitable surface.

It will be apparent that the invention is not limited to the specific compositions, ingredients and proportions specified herein, and that those skilled in the art on becoming acquainted with the teachings of the present invention will be able to conceive various modifications therein within the scope of the ensuing claims.

What I claim is:

1. The method of producing novel polymer compositions which comprises preparing an intimate mixture at approximately 50 degrees C. of at least one vinyl base polymerizable monomer with a paraffinic hydrocarbon composition of at least one hydrocarbon of the type $C_nH_{2n+2}$, containing not more than 20% of unsaturated hydrocarbons as impurities therein and having a boiling point above 300° C. and the melting point below 70° C., allowing said mixture to cool slowly to 20° C. so as to set into a stable homogeneous gel, and exposing said gel to high energy, ionizing radiations until it has received a total dose of 1,500,000 roentgens.

2. The method of producing novel copolymer compositions which comprises preparing an intimate mixture at approximately 50 degrees C. of at least one vinyl base polymerizable monomer with a paraffinic hydrocarbon composition of at least one hydrocarbon of the type $C_nH_{2n-2}$, containing not more than 20 percent of unsaturated hydrocarbons as impurities therein and having a boiling point above 300° C. and a melting point below 70° C., cooling said mixture slowly to 20° C. so as to set into a stable homogeneous gel, and exposing said gel to high energy, ionizing radiations until it has received a total dose of 1,500,000 roentgens.

3. As a novel composition of matter, a copolymer produced according to the method of claim 2.

4. The method claimed in claim 2, wherein said vinyl base monomer is liquid at ordinary temperature.

5. The method claimed in claim 2, wherein said vinyl base monomer is selected from the group consisting of vinyl acetate, styrene and methyl methacrylate.

References Cited in the file of this patent

FOREIGN PATENTS 750,923  Great Britain _____ June 20, 1956

OTHER REFERENCES

Ballantine et al.: "Brookhaven National Laboratory Report No. 414," pp. 1–14, October 1956.

Charlesby I: "Proc. Roy. Soc. (London)," vol. 222A, pp. 60–74, February 23, 1954.

Ballantine: "Modern Plastics," pp. 171–174, 176. September 1957.

Charlesby II: "Nucleonics," pp. 18–25, June 1954.